(12) United States Patent
McIntyre et al.

(10) Patent No.: US 7,430,133 B1
(45) Date of Patent: Sep. 30, 2008

(54) APPARATUS AND METHOD FOR SWITCH CONNECTED AS A DIODE IN A CHARGE PUMP

(75) Inventors: William J. McIntyre, Wheatland, CA (US); Mengzhe Ma, Grass Valley, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 436 days.

(21) Appl. No.: 11/142,079

(22) Filed: May 31, 2005

(51) Int. Cl.
*H02M 3/18* (2006.01)
*G05F 1/10* (2006.01)

(52) U.S. Cl. .............................. 363/60; 363/59; 363/61; 327/536; 307/109

(58) Field of Classification Search ................. 363/59, 363/60, 61; 327/536, 537, 538; 307/109, 307/110
See application file for complete search history.

(56) References Cited

U.S. PATENT DOCUMENTS

| | | | | |
|---|---|---|---|---|
| 5,546,027 A | * | 8/1996 | Shinozaki et al. ............. 327/59 |
| 5,680,300 A | * | 10/1997 | Szepesi et al. ................ 363/59 |
| 6,055,168 A | | 4/2000 | Kotowski et al. |
| 6,107,862 A | * | 8/2000 | Mukainakano et al. ...... 327/536 |
| 6,169,673 B1 | | 1/2001 | McIntyre et al. |
| 6,191,963 B1 | * | 2/2001 | McPartland et al. ........... 363/60 |
| 6,198,645 B1 | | 3/2001 | Kotowski et al. |
| 6,242,970 B1 | * | 6/2001 | Grant et al. ................. 327/536 |
| 6,326,839 B2 | | 12/2001 | Proebsting |
| 6,359,797 B1 | * | 3/2002 | Bayer et al. ................... 363/60 |
| 6,392,904 B1 | * | 5/2002 | Bayer et al. ................... 363/59 |
| 6,504,349 B2 | * | 1/2003 | Jaworski ..................... 323/280 |
| 6,563,235 B1 | | 5/2003 | McIntyre et al. |
| 6,753,623 B2 | | 6/2004 | McIntyre et al. |
| 7,075,280 B2 | * | 7/2006 | May ........................... 323/284 |
| 7,142,040 B2 | * | 11/2006 | Naka et al. .................. 327/536 |

OTHER PUBLICATIONS

Favrat, Pierre, Deval, Philippe, and Declercq, Michel J., "A High-Efficiency CMOS Voltage Doubler", Mar. 1998, pp. 410-416, vol. 33, No. 3, IEEE Journal of Solid-State Circuits.
Favrat, Pierre, Deval, Philippe and Declercq, Michel J., "A New High Efficiency CMOS Voltage Doubler", 1997, pp. 259-262, IEEE 1997 Custom Integrated Circuits Conference.

* cited by examiner

*Primary Examiner*—Jessica Han
*Assistant Examiner*—Emily Pham
(74) *Attorney, Agent, or Firm*—Darby & Darby PC; Matthew M. Gaffney (57) ABSTRACT

A switched-capacitor type voltage regulator is provided. The regulator includes a flying capacitor and switches, including first and second transistors which operate as switches. The switches are arranged to operate such that the flying capacitor is coupled to an input voltage during a first phase, and switched to provide an output voltage during a second phase. During the first phase, the first transistor is employed to couple the capacitor to the input voltage, and a second transistor is employed to couple (the other side of) the capacitor to another node (e.g. Ground). Additionally, another switch is coupled between the gate and the drain of either the first transistor or the second transistor. Also, during the first phase, if the input voltage is greater than the output voltage, the other switch is closed so that the transistor that the other switch is connected to operates as a diode.

19 Claims, 9 Drawing Sheets

Phase 1

Figure 5B

Phase 2

Figure 5C

Phase 1

Figure 6A

Phase 2

APPARATUS AND METHOD FOR SWITCH CONNECTED AS A DIODE IN A CHARGE PUMP

FIELD OF THE INVENTION

The invention is related to voltage converters, and in particular, to an apparatus and method for a charge pump including a transistor switch which may be connected as a diode.

BACKGROUND OF THE INVENTION

Small electronic devices are commonly powered by batteries, which allow such devices to be portable. However, as battery use continues, the battery voltage drops, sometimes uniformly and sometimes in spurts, depending in part on the type of battery, the type of electronic device, and the frequency of device use. Such variations in the battery voltage may have undesirable effects on the operation of the electronic device powered by the battery. Consequently, DC-DC converters are commonly used to provide a constant and stable output supply voltage from the battery to the electronic device.

Switched capacitor circuitry is used in several power converter applications and is particularly advantageous where the use of inductors is to be avoided. The circuitry may include voltage regulation for controlling the magnitude of the output voltage notwithstanding changes in magnitude of the input voltage and changes in the load driven by the circuitry. A conventional method to regulate voltages in fixed gain capacitor DC-DC converters is to use pulse frequency modulation (PFM) or pulse skipping.

BRIEF DESCRIPTION OF THE DRAWINGS

Non-limiting and non-exhaustive embodiments of the present invention are described with reference to the following drawings, in which.

DETAILED DESCRIPTION

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data, or other signal. Where either a field effect transistor (FET) or a bipolar junction transistor (BJT) may be employed as an embodiment of a transistor, the scope of the words "gate", "drain", and "source" includes "base", "collector", and "emitter", respectively, and vice versa.

Briefly stated, the invention is related to a switched-capacitor type voltage regulator that includes a flying capacitor and switches, including first and second transistors which operate as switches. The switches are arranged to operate such that the flying capacitor is coupled to an input voltage during a first phase, and switched to provide an output voltage during a second phase. During the first phase, the first transistor is employed to couple the capacitor to the input voltage, and a second transistor is employed to couple (the other side of) the capacitor to another node (e.g. Ground). Additionally, another switch is coupled between the gate and the drain of either the first transistor or the second transistor. Also, during the first phase, if the input voltage is greater than the output voltage, the other switch is closed so that the transistor that the other switch is connected to operates as a diode. This prevents a p-n junction between the substrate and drain of the second transistor from being turned on during a time other than phase one.

Figure 1:
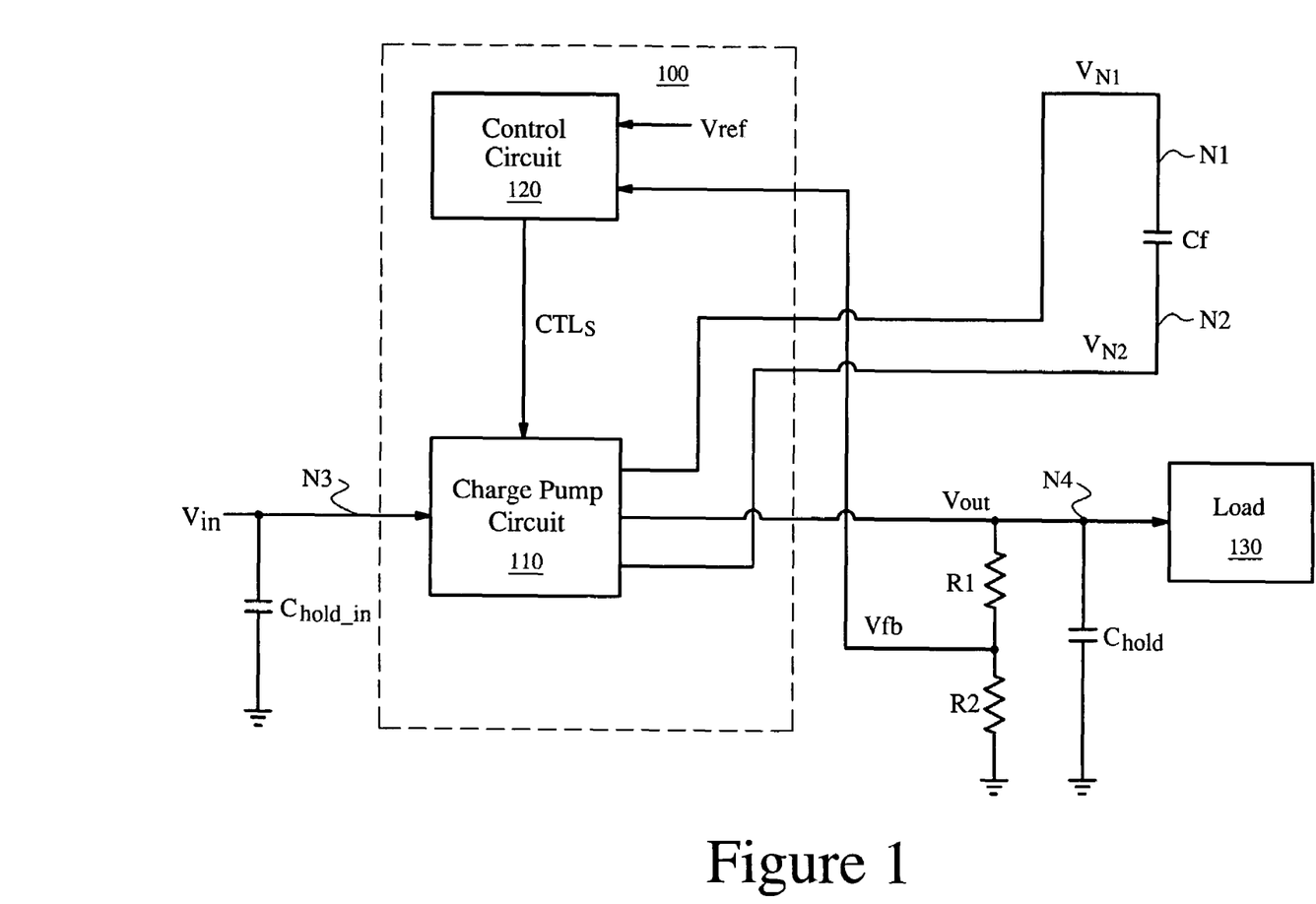
FIG. 1 illustrates a block diagram of an embodiment of a voltage converter circuit and external components.

FIG. 1 illustrates a block diagram of an embodiment of voltage converter circuit 100 and external components. The external components may include resistors R1 and R2, flying capacitor circuit Cf, hold capacitor $C_{hold}$, input hold capacitor $C_{hold\_in}$, and load 130. In various embodiments, more or less external components than shown in FIG. 1 may be employed. Voltage converter circuit 100 includes switch array circuit 110 and control circuit 120.

Figure 9:
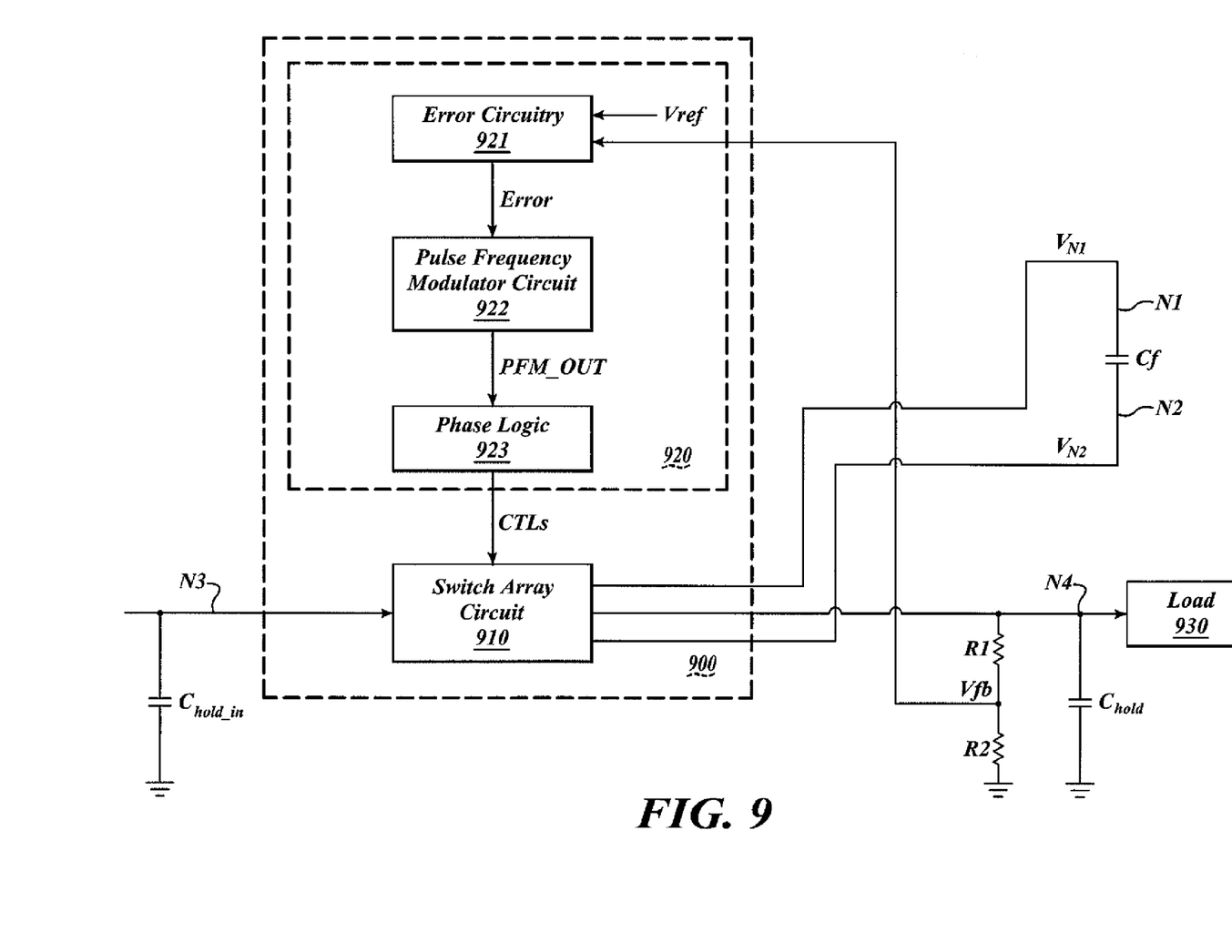
FIG. 9 illustrates a block diagram of an embodiment of the voltage converter circuit and external components of FIG. 1.

In operation, voltage converter circuit 100 provides output voltage Vout (to drive load 130) based on input voltage Vin and feedback voltage Vfb. Resistor R1 and R2 may be arranged to provide feedback voltage Vfb from output voltage Vout. Also, control circuit 120 is arranged to provide control signals CTLs based, at least in part, on feedback signal Vfb and reference voltage Vref. In one embodiment, as illustrated in FIG. 9 in one embodiment, at least one of the control signals in control signals CTLs is a pulse-frequency-modulated signal, where modulation of the frequency is based on an error signal (not shown), and where the error signal is based on the difference between feedback voltage Vfb and reference voltage Vref. Input hold capacitor $C_{hold\_in}$, switch array circuit 110, and flying capacitor circuit Cf operate together as a charge pump circuit.

Switch array circuit 110 includes switches. Further, switch array circuit 110 operates with two or more phases, where the phases are defined by control signals CTLs. During a first phase, switch array circuit 110 couples flying capacitor circuit Cf to node N3. During a second phase, switch array circuit 110 couples flying capacitor circuit 110 to node N4 to provide voltage Vout.

In various embodiments of switch array circuit 110 in accordance with aspects of the invention, switch array circuit 110 may be arranged to provide a variety of different gains. In one embodiment, switch array circuit 110 is arranged to provide a gain of two. In this embodiment, during the first phase, switch array circuit 110 couples node N1 to node N3, and couples node N2 to GND. Further, if input voltage Vin is less than output voltage Vout, the voltage ($V_{N1}$) at node N1 is Vin, the voltage ($V_{N2}$) at node N2 is 0, and the voltage across flying capacitor circuit Cf is Vin.

However, switch array circuit 110 is arranged such that, if voltage Vin is greater than voltage Vout, the voltage across flying capacitor circuit Cf is less than voltage Vout. This may be accomplished by providing voltage $V_{N1}$ so that voltage $V_{N1}$ is less than voltage Vin, by providing voltage $V_{N2}$ such that voltage $V_{N2}$ is greater than zero, or both.

In this embodiment, during the second phase, switch array circuit 110 couples node N2 to node N3, and couples node N1 to node N4 to provide voltage Vout. Based on voltage regulation control performed by control circuit 120, voltage Vout is regulated to a desired value. In one embodiment, voltage Vout is regulated to 5.0V, and voltage Vin can vary from 3.0V to 5.5V.

In one embodiment, flying capacitor circuit Cf is a single capacitor. In other embodiments, flying capacitor circuit Cf may include two or more capacitors arranged in series and/or in parallel to provide an equivalent capacitance.

In one embodiment, the components illustrated switch array circuit 110 and control circuit 120 are included in an integrated circuit, and the other components illustrated in FIG. 1 are external to the integrated circuit. However, in other embodiments, some of the components shown as external to voltage converter circuit 100 in FIG. 1 may be included in the integrated circuit. For example, in one embodiment, switch array circuit 110, control circuit 120, resistor R1, and resistor R2 are all included in the same integrated circuit. Also, although not shown in FIG. 1, in one embodiment, switch array circuit 110 is connected to ground.

Figure 2:
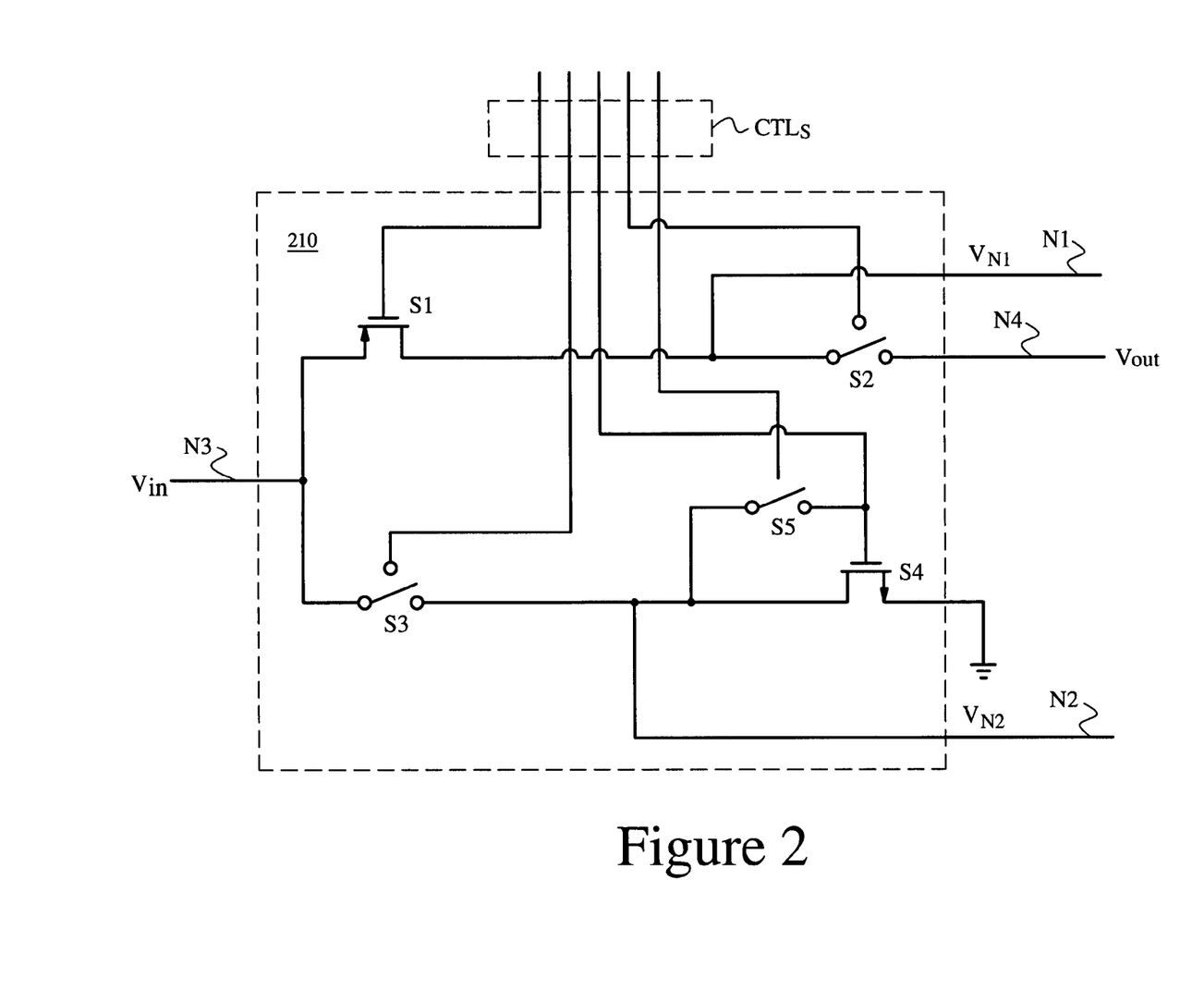
FIG. 2 shows a block diagram of an embodiment of the switch array circuit of FIG. 1.

FIG. 2 shows a block diagram of an embodiment of the switch array circuit 210, which may be employed as an embodiment of switch array circuit 110 of FIG. 1. Switch array circuit 210 includes transistors S1 and S4 and switch circuits S2, S3, and S5.

Transistor S4 operates as a switch circuit. Further, transistor S4 operates as a diode if switch circuit S5 is closed, and operates as a switch circuit if switch circuit S5 is open.

In the embodiment of switch array circuit 210 shown in FIG. 2, switch array circuit 210 provides a gain of two. If voltage regulation was not performed, voltage Vout would simply be equal to an unregulated voltage of 2*Vin without load current. However, by employing voltage regulation, output voltage Vout is regulated to a voltage that is less than 2*Vin. In one embodiment, if output voltage Vout is greater than the desired output voltage, control circuit 120 (of FIG. 1) maintains phase one to regulate voltage Vout. Control circuit 120 (of FIG. 1) controls which phase switch array circuit 210 is operating in, and provides control signals CTLs accordingly.

Although control signals CTLs are shown as five differential signals, in some embodiments, two or more of the signals may be the same signal, so that control signals CTLs include less than five signals. In one embodiment, rather than five separate signals as shown, two signals are employed, where the two signals are non-overlapping clock signals.

During phase one, the voltage at the gate of transistor S1 is asserted (low) so that transistor S1 operates in a conducting mode, and the voltage at the gate of transistor S4 is asserted (high) so that transistor S4 operates in a conducting mode. Also, during phase one, the voltage at the control inputs to switch circuits S2 and S3 are logic high (unasserted) so that switch circuits S2 and S3 are open. Additionally, during phase one, the voltage at the control input of switch circuit S5 is asserted (high) if input voltage Vin is greater than output voltage Vout, and unasserted otherwise.

Accordingly, during phase one, if voltage Vin is less than output voltage Vout, voltage $V_{N1}$ is Vin, and voltage $V_{N2}$ is zero. Consequently, the voltage across flying capacitor circuit Cf (of FIG. 1) is Vin.

However, during phase one, if voltage Vin is greater than output volt Vout, voltage $V_{N1}$ is Vin, and voltage $V_{N2}$ is $VGS_{S4}$. Accordingly, the voltage across flying capacitor circuit Cf is Vin–$VGS_{S4}$.

During phase two, the voltage at the gate of transistor S1 is logic high (unasserted) so that transistor S1 operates in a non-conducting mode, and the voltage at the gate of transistor S4 is logic low (unasserted) so that transistor S4 operates in a non-conducting mode. Also, during phase two, the voltage at the control inputs to switch circuits S2 and S3 are asserted (low) so that switch circuit S2 and S3 are closed, and the voltage at the control input to switch circuit S5 is low (unasserted) so that switch circuit S5 is open.

In one embodiment, voltage Vin can vary from 3.0V to 5.5V, and output voltage Vout is regulated to 5.0V. In this embodiment, switch circuit S5 ensures that the voltage across flying capacitor circuit Cf does not exceed 5.0V.

When phase two begins, switch circuit S2 is closed before switch circuit S3 is closed. Accordingly, there is a small interval of time at the beginning of phase two in which switch circuit S2 is closed and switch circuit S3 is open. During this small interval of time, the voltage $V_{N2}$ is substantially given by Vout–$V_{Cf}$, where $V_{Cf}$ is the voltage across flying capacitor circuit Cf. Switch circuit S5 prevents voltage $V_{N2}$ from being less than GND when switch circuit S2 is closed and switch circuit S3 is open. In one embodiment, transistor S4 is a NMOSFET built into a p-type substrate that is tied to GND. By preventing voltage $V_{N2}$ from going below GND, switch circuit S5 prevents the p-n junction between the n-type drain of transistor S4 and the p-type substrate of transistor S4 from being turned on.

Although one embodiment of switch array circuit 210 is discussed above, other embodiments are within the scope and spirit of the invention. For example, in various embodiments, logic of one or more of the signals discussed above may be reversed. In one embodiment, instead of switch circuit S2 being closed in response to a signal that is asserted low, switch circuit S2 may instead be configured such that switch circuit S2 is closed in response to a control signal that is asserted high, and open in response to the control signal being low (unasserted).

Similarly, although an example of a particular output voltage and a particular input voltage range was discussed above, in various embodiments, a variety of different output voltages and input voltage ranges may be employed within the scope and spirit of the invention. Additionally, although switch array circuit 210 is illustrated as having a gain of two in FIG. 2, in other embodiment, switch array circuit 210 may have a gain other than two.

Further, in the embodiment discussed above, during phase one, switch circuit S5 is closed if input voltage Vin is greater than output voltage Vout, and open otherwise. This may be useful, for example, in the case where the input voltage can range as low as 2.6V, the gain of the switch array is two, and the output voltage is 5.0V. In this embodiment, if input voltage Vin is 2.6V, and switch circuit S5 is closed, voltage $V_{Cf}$ is 2.6V−$VGS_{S4}$. Accordingly, if switch circuit S5 is closed during phase one for this input voltage and gain, output voltage Vout cannot be regulated to 5.0V. By leaving switch circuit S5 open, when the input voltage is 2.6V and the gain is two, the output voltage can be regulated to 5.0. For this reason, in one embodiment, during phase one, switch circuit S5 is closed if input voltage Vin is greater than output voltage Vout, and open otherwise.

However, in an embodiment in which the gain is two, the output voltage is 5.0V, and the input voltage Vin ranges from 3.5V to 5.5V, there may be no need to leave switch circuit S5 open during phase one. Accordingly, in one embodiment, switch circuit S5 is controlled such that switch circuit S5 is closed during phase one, and open during phase two. Further, in some embodiments, the comparison need not be made to the output voltage. For example, in the case where the gain is two, the input voltage Vin ranges from 2.6V to 5.5V, and output voltage Vout is 5.0V, instead of comparing input voltage Vin to output voltage Vout, input voltage Vin could be compared to another value, anywhere from 2.6V+$VGS_{S4}$ to Vout. In any case, switch circuit S5 is closed if phase one is occurring and input voltage Vin is greater than Vout. However, in some embodiments, if phase one is occurring and input voltage Vin is less than output Vout, switch circuit S5 might be closed.

Also, although the source of transistor S4 is shown as coupled to ground in FIG. 2, in other embodiments, the source of transistor S4 may be coupled to a different voltage, such as VSS. These variations and others are within the scope and spirit of the invention.

Figure 3:
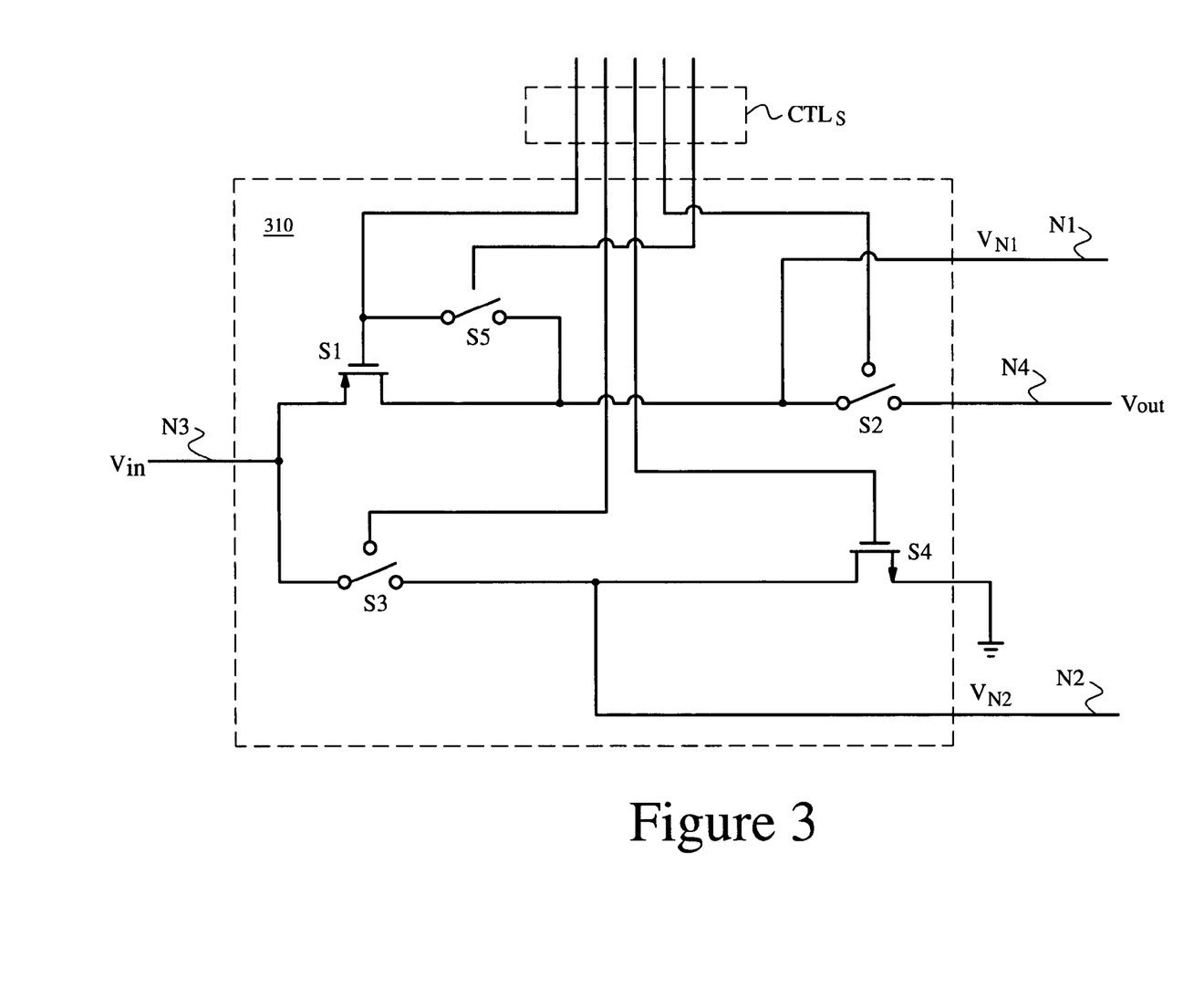
FIG. 3 illustrates a diagram of another embodiment of the switch array circuit of FIG. 1.

FIG. 3 illustrates an embodiment of switch array circuit 310, which may be employed as an embodiment of switch array circuit 110 of FIG. 1. Switch array circuit 310 is substantially similar to switch array circuit 210 of FIG. 2, except that, in switch array circuit 310, switch circuit S5 is coupled between the gate and drain of transistor S1 (as opposed to being coupled between the gate and drain of transistor S4, as was the case in switch array circuit 210 of FIG. 2).

In a similar manner to switch array circuit 210 of FIG. 2 above, during phase one, the voltage at the gate of transistor S1 is asserted (low) so that transistor S1 operates in a conducting mode, and the voltage at the gate of transistor S4 is asserted (high) so that transistor S1 operates in a conducting mode. Also, during phase one, the voltage at the control inputs to switch circuits S2 and S3 are logic high (unasserted) so that switch circuits S2 and S3 are open. Additionally, during phase one, the voltage at the control input of switch circuit S5 is asserted (high) if input voltage Vin is greater than output voltage Vout, and unasserted otherwise.

Accordingly, during phase one, if voltage Vin is less than output voltage Vout, voltage $V_{N1}$ is Vin, and voltage $V_{N2}$ is zero. Consequently, the voltage across flying capacitor circuit Cf (of FIG. 1) is Vin.

However, during phase one, if voltage Vin is greater than output volt Vout, voltage $V_{N1}$ is Vin−|$VGS_{S1}$|, and voltage $V_{N2}$ is 0V. Accordingly, the voltage across flying capacitor circuit Cf is Vin−|$VGS_{S1}$|.

During phase two, the voltage at the gate of transistor S1 is logic high (unasserted) so that transistor S1 operates in a non-conducting mode, and the voltage at the gate of transistor S4 is logic low (unasserted) so that transistor S4 operate in a non-conducting mode. Also, during phase two, the voltage at the control inputs to switch circuits S2 and S3 are asserted (low) so that switch circuit S2 and S3 are closed, and the voltage at the control input to switch circuit S5 is low (unasserted) so that switch circuit S5 is open.

In one embodiment, voltage Vin can vary from 3.0V to 5.5V, and output voltage Vout is regulated to 5.0V. In this embodiment, switch circuit S5 ensures that the voltage across flying capacitor circuit Cf does not exceed 5.0V. In one embodiment, by preventing voltage $V_{N2}$ from going below GND, switch circuit S5 prevents the p-n junction between the n-type drain of transistor S4 and the p-type substrate of transistor S4 from being turned on.

In a similar manner as discussed above with reference to switch array circuit 210 of FIG. 2, although one embodiment of switch array circuit 310 is discussed above and illustrated in FIG. 3, other embodiments of switch array circuit 310 are within the scope and spirit of the invention.

Figure 4A:
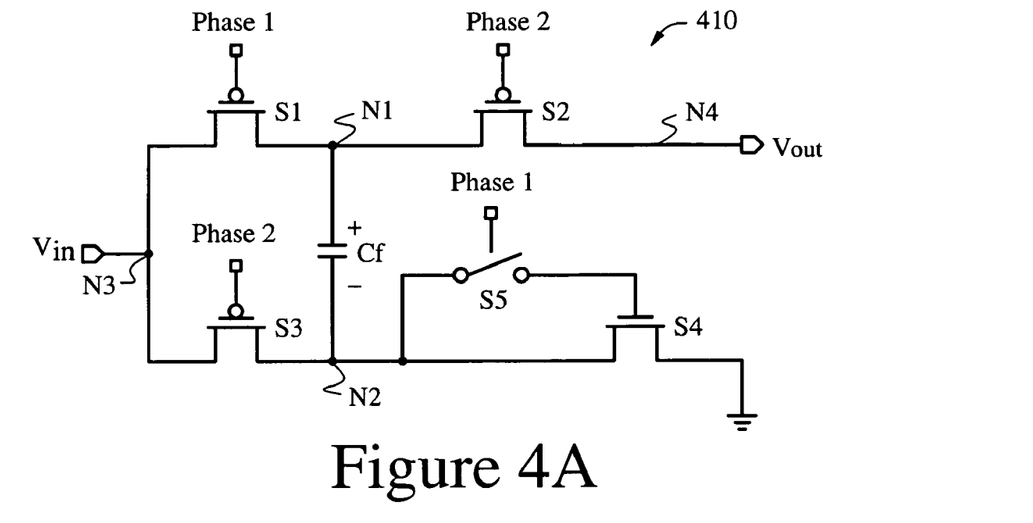
FIGS. 4A-4C shows diagrams of an embodiment of the charge pump circuit of FIG. 1.

FIG. 4A shows a diagram of an embodiment of charge pump circuit 410, which includes an embodiment of switch array circuit 110 and flying capacitor circuit Cf of FIG. 1.

Figure 4B:
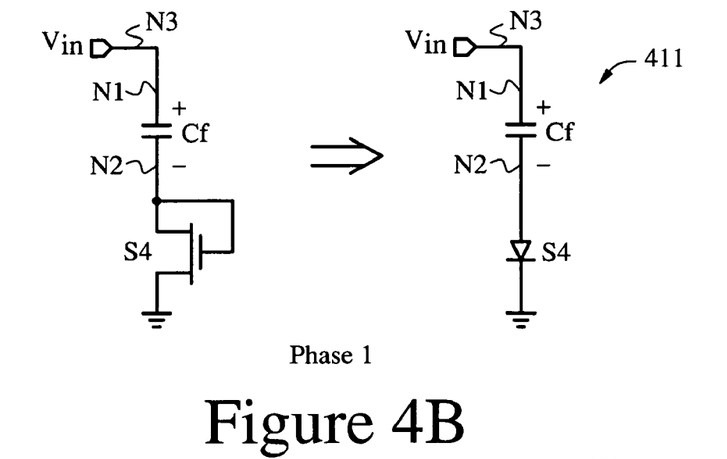

FIG. 4B shows a diagram of an embodiment of an arrangement 411 of charge pump circuit 410 during phase 1 if switch circuit S4 is closed. As shown, if switch circuit S5 is closed, transistor S4 operates as a diode so that voltage $V_{Cf}$ is less than input voltage Vin.

Figure 4C:
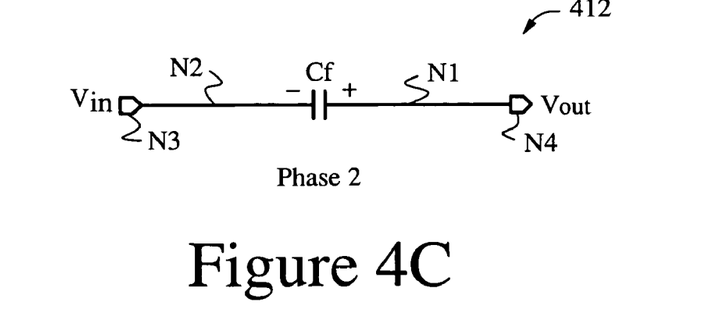

FIG. 4C shows a diagram of an arrangement 412 of charge pump circuit 410 during phase 2. During phase two, flying capacitor circuit Cf is coupled between node N3 and node N4.

Figure 5A:
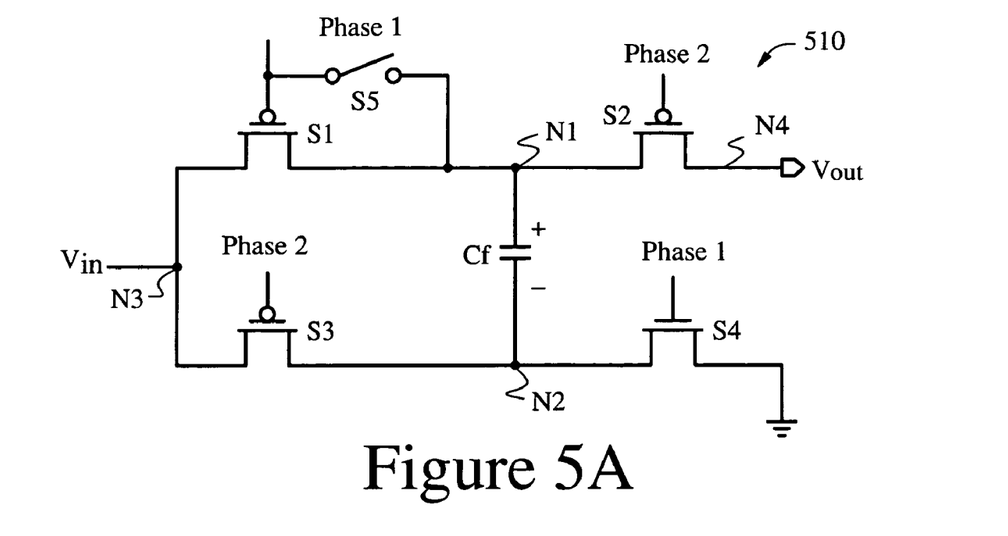
FIGS. 5A-5C illustrate diagrams of another embodiment of the charge pump circuit of FIG. 1, FIGS. 6A-6B show diagrams of a portion of yet another embodiment of the charge pump circuit of FIG. 1.

FIG. 5A shows a diagram of an embodiment of charge pump circuit 510, which includes an embodiment of switch array circuit 110 and flying capacitor circuit Cf of FIG. 1.

Figure 5B:
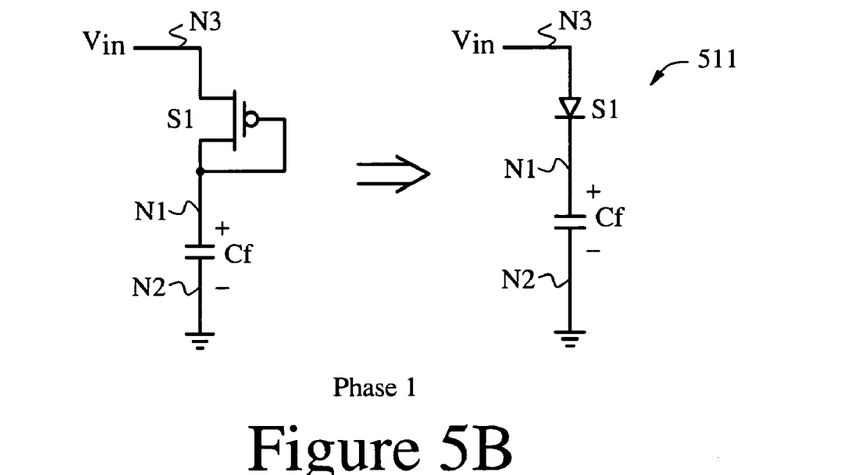

FIG. 5B shows a diagram of an embodiment of an arrangement 511 of charge pump circuit 510 during phase 1 if switch circuit S5 is closed. As shown, if switch circuit S5 is closed, transistor S1 operates as a diode so that $V_{Cf}$ is less than voltage Vin.

Figure 5C:
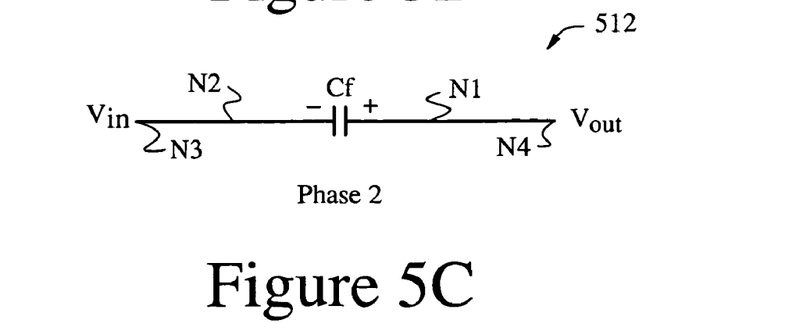

FIG. 5C shows a diagram of an arrangement 512 of charge pump circuit 510 during phase 2. During phase two, flying capacitor circuit Cf is coupled between node N3 and node N4.

Figure 6A:
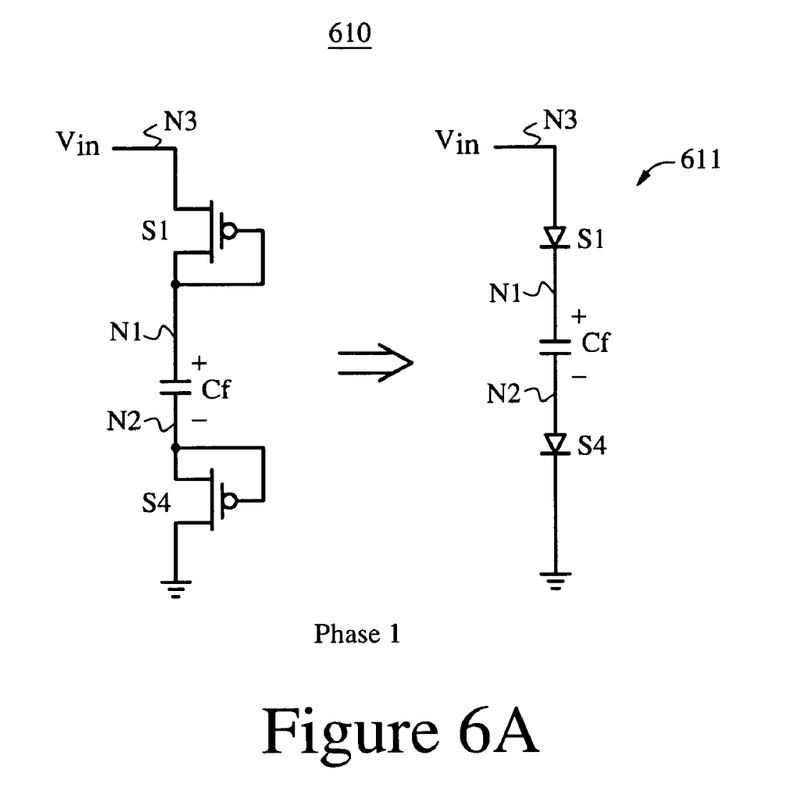

FIG. 6A illustrate an embodiment of charge pump circuit 610 in an arrangement 611, which occurs during phase one if input voltage Vin is greater than output voltage Vout. Charge pump circuit 610 includes an embodiment of switch array circuit 110 and flying capacitor circuit Cf of FIG. 1. Charge pump circuit 610 includes both a switch circuit between the gate and drain of transistor S1 (as in switch array circuit 210 of FIG. 2 and charge pump 410 of FIG. 4) and another switch circuit between the gate and drain of transistor S4 (as in switch array circuit 310 of FIG. 3 and charge pump 510 of FIG. 5). During arrangement 611, voltage $V_{Cf}$ across flying capacitor circuit Cf is Vin−|$VGS_{S1}$|−$VGS_{S4}$. Charge pump circuit 610 may be useful if voltage Vin can be more than one diode drop above voltage Vout.

In one embodiment, switches are employed so that transistors S1 and S4 are both arranged as diodes (as illustrated in FIG. 6A) if input voltage Vin is greater than output voltage Vout. In another embodiment, two comparisons are made, comparing voltage Vin both to Vout, and to Vout+Va (where, e.g., Va is approximately $VGS_{S4}$). In this embodiment, if Vin>Vout+Va, transistors S1 and S4 both operate as diodes. However, if Vin>Vout but Vin<Vout+Va, only one of the transistor S1 and S4 operates as a diode (by closing the corresponding switch), and the other operates substantially as a short circuit (by opening the corresponding switch).

Figure 6B:
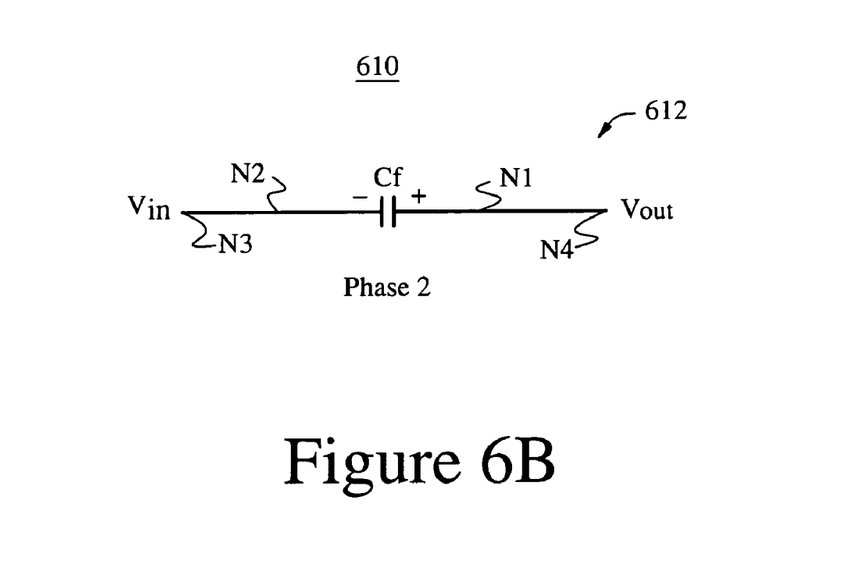

FIG. 6B shows a diagram of an arrangement 612 of charge pump circuit 610 during phase 2. During phase two, flying capacitor circuit Cf is coupled between node N3 and node N4.

Figure 7A:
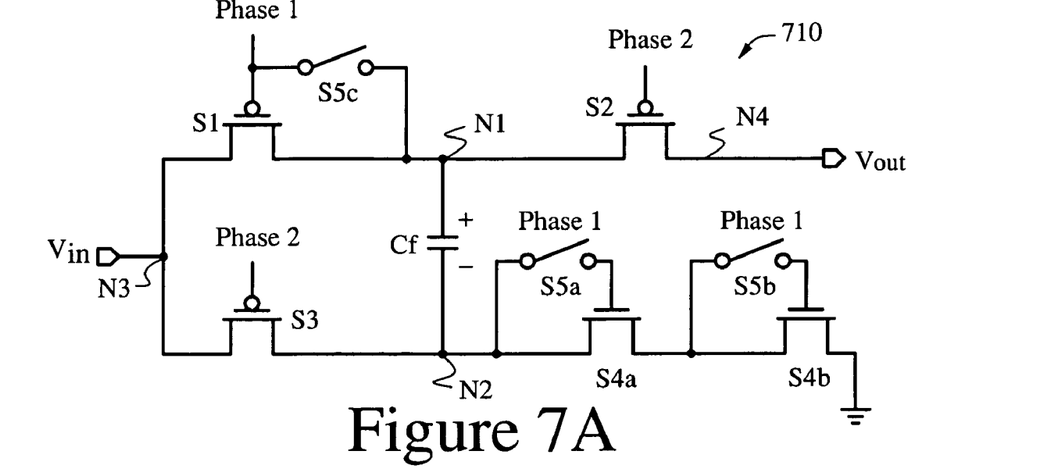
FIGS. 7A-7C illustrate diagrams of an embodiment of the switch array circuit of FIG. 6.

If input voltage Vin can be greater than two diode drops above output voltage Vout, more than two diodes may be employed, as shown in FIG. 7A below in one embodiment.

Figure 7B:
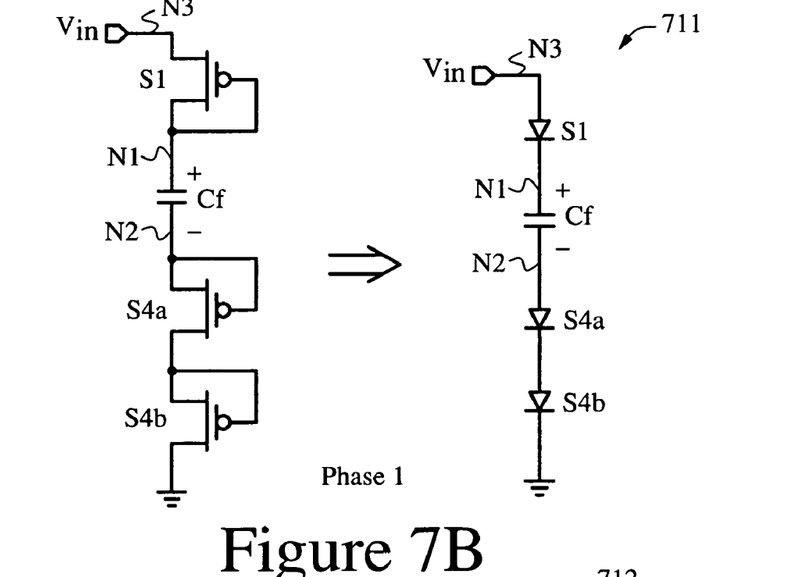
Figure 7C:
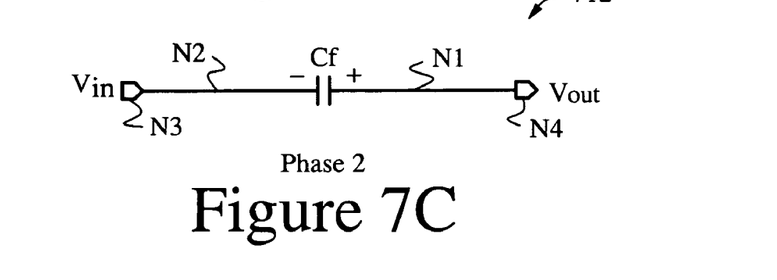

FIGS. 7A-7C illustrates diagrams of charge pump circuit 710. Charge pump circuit 710 may be employed as an embodiment of charge pump circuit 610 of FIG. 6. FIG. 7B illustrates arrangement 711, which occurs during phase one if input Vin is greater than two diodes drops above output voltage Vout; and FIG. 7C illustrates arrangement 712, which occurs during phase two. Charge pump circuit 710 includes two transistors S4a and S4b instead of a single transistor S4. Each of transistors S4a, S4b, and S1 has a separate switch circuit (S5a, S5b, and S5c, respectively) coupled between its gate and drain. In arrangement 711, and shown in FIG. 7B, switch circuits 5a, 5b, and 5c are all closed.

Although embodiments of switch array circuits previously illustrated have a gain of two, the invention is not so limited, and a variety of different gains may be employed in accordance with aspects of the inventions.

Figure 8A:
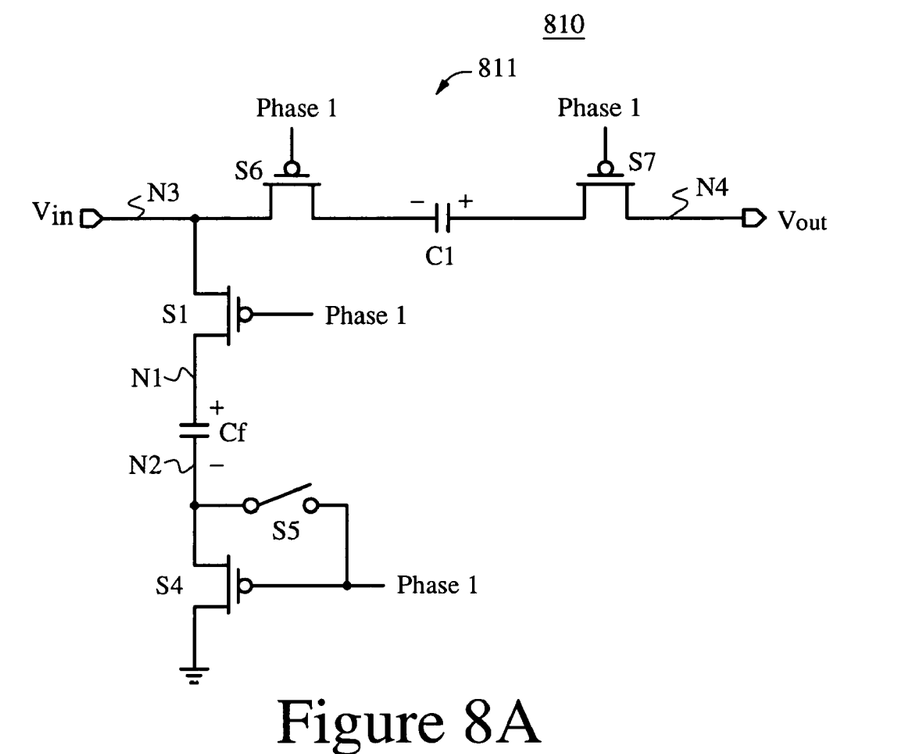
FIGS. 8A-8B show diagrams of an embodiment of the switch array circuit of FIG. 4 with a gain of 3/2, arranged in accordance with aspects of the present invention.
Figure 8B:
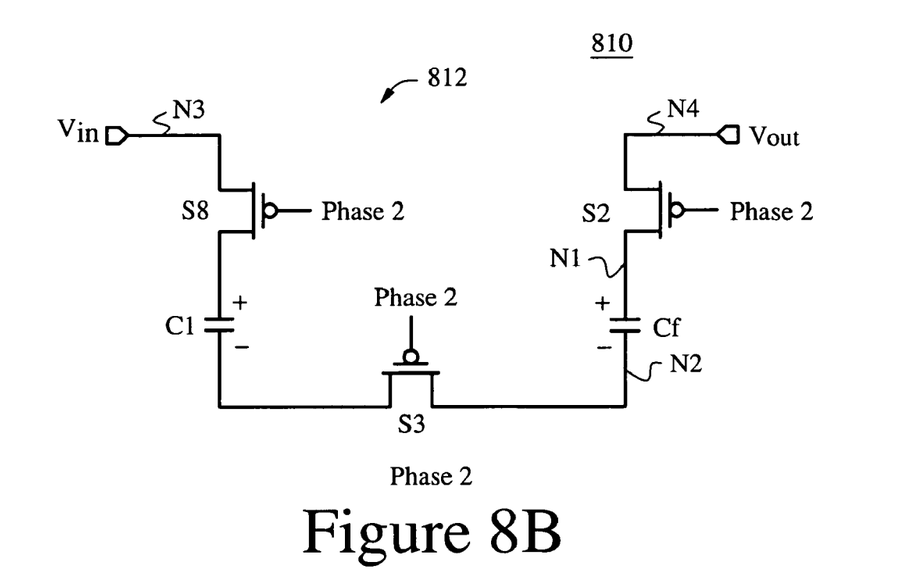

FIGS. 8A and 8B illustrate charge pump circuit 810, which has a gain of 3/2. Charge pump circuit 810 may be employed as an embodiment of charge pump circuit 410 of FIG. 4A. Charge pump circuit 810 further includes capacitor C1 and transistors S6-S8. Transistors S6 and S7 each operate as a switch circuit that closes during phase one. Transistor S8 operates as a switch circuit that closes during phase two.

FIG. 8A shows an arrangement 811 of charge pump circuit 810, which occurs during phase one. As shown in FIG. 8A, during phase one, transistors S1, S4, S6, and S7 are conducting, and transistors S1, S3, and S8 are each non-conducting. In charge pump 810, transistor S3 is connected between the negative terminal of capacitor Cf and the negative terminal of capacitor C1. As previously discussed, during phase one, if input voltage Vin is greater than output voltage Vout, switch circuit S5 is closed. Otherwise, switch circuit S5 is open.

FIG. 8B shows an arrangement 812 of charge pump circuit 810, which occurs during phase two. As shown in FIG. 8B, during phase two, transistors S1, S3, S5, and S8 are each conducting, and transistors S1, S4, S6, and S7 are each non-conducting.

FIG. 9 illustrates a block diagram of voltage converter circuit 900, and external components, wherein voltage converter circuit 100 is an embodiment of voltage converter 100 of FIG. 9. Control circuit 920 includes error circuitry 921, pulse frequency modulation circuit 922, and phase logic 920. At least one of the control signals in control signals CTLs (provided by phase logic 923) is a pulse-frequency-modulated signal, where modulation of the frequency (performed by pulse modulation circuit 922) is based on an error signal (Error), and where error signal Error, provided by error circuitry 921, is based on the difference between feedback voltage Vfb and reference voltage Vref.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A voltage converter circuit, comprising:
 a first transistor that is arranged to couple a flying capacitor circuit to an input voltage node during a first phase;
 a second transistor that is arranged to couple the flying capacitor circuit to another node during the first phase, such that the flying capacitor circuit is coupled between the input voltage node and the other node during the first phase;
 a first switch circuit that is arranged to couple the flying capacitor circuit to an output voltage node during a second phase; and
 a second switch circuit that is configured such that: during the first phase,
  if an input voltage at the input voltage node is greater than an output voltage at an output node, then
   a voltage across the flying capacitor circuit is less than the input voltage,
  else
   the voltage across the flying capacitor circuit is substantially equal to the input voltage.

2. The voltage converter circuit of claim 1, further comprising:
 a control circuit, wherein
  the control circuit includes a pulse frequency modulation circuit that is arranged to perform pulse frequency modulation based, at least in part, on a feedback signal, wherein the feedback signal is based, at least in part, on the output voltage;
  the control circuit is arranged to control the first transistor, the second transistor, the first switch circuit, and the second switch circuit; and
  wherein the control circuit is arranged to control whether the first phase is occurring and whether the second phase is occurring based at least in part on the pulse frequency modulation.

3. The voltage converter circuit of claim 1, further comprising:
 a third switch circuit that is arranged to couple the flying capacitor circuit to the input voltage node during the second phase; and
 a control circuit that is arranged to control the first, second, and third switches and the first and second transistors, wherein second transistor is built into a substrate that is coupled to the other node; the other node is a ground node; and wherein the control circuit is arranged to control the first and third switch such that, at the beginning of the second phase, the first switch circuit closes before the third switch circuit closes.

4. A voltage converter circuit, comprising:
 a first transistor that is arranged to couple a flying capacitor circuit to an input voltage node during a first phase;
 a second transistor that is arranged to couple the flying capacitor circuit to another node during the first phase, such that the flying capacitor circuit is coupled between the input voltage node and the other node during the first phase;
 a first switch circuit that is arranged to couple the flying capacitor circuit to an output voltage node during a second phase;
 a second switch circuit that is configured such that: during the first phase, if an input voltage at the input voltage node is greater than an output voltage at an output node, then a voltage across the flying capacitor circuit is less than the input voltage; and
 a control circuit that is arranged to control the second switch circuit, wherein the second switch circuit is coupled to the first transistor, the second switch circuit is arranged such that the first transistor is in a diode configuration if the second switch circuit is closed, and wherein the control circuit is arranged to control the second switch circuit such that second switch circuit is closed during the first phase if the input voltage is greater than the output voltage.

5. A voltage converter circuit, comprising:
a first transistor that is arranged to couple a flying capacitor circuit to an input voltage node during a first phase;
a second transistor that is arranged to couple the flying capacitor circuit to another node during the first phase, such that the flying capacitor circuit is coupled between the input voltage node and the other node during the first phase;
a first switch circuit that is arranged to couple the flying capacitor circuit to an output voltage node during a second phase;
a second switch circuit that is configured such that: during the first phase, if an input voltage at the input voltage node is greater than an output voltage at an output node, then a voltage across the flying capacitor circuit is less than the input voltage; and
a control circuit that is arranged to control the second switch circuit, wherein the second switch circuit is coupled to the second transistor, the second switch circuit is arranged such that the second transistor is in a diode configuration if the second switch circuit is closed, and wherein the control circuit is arranged to control the second switch circuit such that second switch circuit is closed during the first phase if the input voltage is greater than the output voltage.

6. The voltage converter circuit of claim 5, wherein the control circuit is arranged to control the second switch circuit such that:
if the first phase is occurring:
the second switch circuit is closed,
else
the second switch circuit is open.

7. The voltage converter circuit of claim 5, wherein the control circuit is arranged to control the second switch circuit such that:
if the first phase is occurring and the input voltage is greater than the output voltage:
the first switch circuit is closed,
else
the first switch circuit is open.

8. A voltage converter circuit, comprising:
a first transistor that is coupled between an input voltage node and a first capacitor node, wherein the first transistor is arranged to operate in a conducting mode during a first phase, and to operate in a non-conducting mode during a second phase; and wherein the first transistor has at least a gate;
a second transistor that is coupled between a second capacitor node and another node, wherein the second transistor is arranged to operate in a conducting mode during the first phase, and to operate in a non-conducting mode during the second phase; the second transistor has at least a gate; and wherein the voltage converter circuit is arranged to operate with a flying capacitor circuit between the first and second capacitor nodes;
a first switch circuit that is coupled between the first capacitor node and an output node, wherein the first switch circuit is arranged to be closed during the second phase, and to be open during the first phase; and
a second switch circuit that is configured to be closed if a second-switch control signal is asserted, and to be open if the second-switch control signal is unasserted, wherein the second switch control signal is arranged in one of the following manners:
the second switch circuit is coupled between the first capacitor node and the gate of the first transistor, or
the second switch circuit is coupled between the second capacitor node and the gate of the second transistor; and
a control circuit that is arranged to control whether the first phase is occurring and whether the second phase is occurred based on a feedback voltage that is based at least in part on an output voltage at the output voltage node, wherein the control circuit is coupled to the gate of the first and second transistors, and wherein the control circuit is arranged to provide the second-switch control signal such that:
if the first phase is occurring and an input voltage at the input voltage node is greater than the output voltage, the second-switch control signal is asserted.

9. The voltage converter circuit of claim 8, wherein the second switch circuit is coupled between the second capacitor node and the gate of the second transistor, the voltage converter circuit further comprising:
a third switch circuit that is coupled between the first capacitor node and the gate of the first transistor.

10. The voltage converter circuit of claim 8, wherein the control circuit is arranged to provide the second-switch control signal such that:
if the first phase is occurring and an input voltage at the input voltage node is greater than the output voltage:
the second-switch control signal is asserted;
else:
the second-switch control signal is unasserted.

11. The voltage converter circuit of claim 8, further comprising:
a third switch circuit that is coupled between the second capacitor node and the input voltage node, wherein the third switch circuit is arranged to be closed during the second phase, and to be open during the first phase.

12. The voltage converter circuit of claim 11, wherein the other node is Ground.

13. The voltage converter circuit of claim 11, further comprising:
a third transistor having at least a gate, a drain, and a source, wherein the drain of the third transistor is coupled to the other node, and wherein the source of the third transistor is coupled to Ground; and
a fourth switch circuit that is coupled between the gate of the third transistor and the drain of the third transistor, wherein the fourth switch circuit is arranged to be closed if a second-switch control signal is asserted, and to be open if the second-switch control is unasserted.

14. The voltage converter circuit of claim 11, wherein second transistor is built into a substrate that is coupled to Ground, the first transistor is a p-type transistor, the second transistor is an n-type transistor, the first switch circuit is another p-type transistor, and the third switch circuit is yet another p-type transistor.

15. The voltage converter circuit of claim 11, wherein the first transistor, the second transistor, the first switch circuit, and the third switch circuit are arranged such that the voltage converter circuit has a gain of two.

16. The voltage converter circuit, of claim 11, further comprising:
a fourth switch circuit that is coupled between the input voltage node and a third capacitor node, wherein the fourth switch circuit is arranged to be closed during the first phase;
a fifth switch circuit that is coupled between the output node and a fourth capacitor node, wherein the fifth switch circuit is arranged to be closed during the first phase, and wherein the voltage converter circuit is arranged to operate with another flying capacitor circuit coupled between the third and fourth capacitor nodes; and a sixth switch circuit that is coupled between the fourth capacitor node and the input voltage node, wherein the sixth switch circuit is arranged to be closed during the second phase.

17. A method for providing an output voltage at an output node, comprising:

providing a feedback signal that is based, at least in part, on the output voltage;

performing pulse frequency modulation based, at least in part, on the feedback signal to provide a pulse frequency modulation output signal, such that a first phase occurs if the pulse frequency modulation output signal corresponds to a first level, and such that a second phase occurs if the pulse frequency modulation output signal corresponds to a second level;

employing a first transistor to couple a flying capacitor circuit to an input voltage node during the first phase;

employing a second transistor to couple the flying capacitor circuit to the output voltage during the second phase; and controlling a first switch circuit, wherein controlling the first switch circuit includes:
if the first phase is occurring and an input voltage at the input voltage node is greater than the output voltage:
closing the first switch circuit;
else:
opening the first switch circuit.

18. The method of claim 17, wherein the first switch circuit is coupled between a gate of the first transistor and a drain of the first transistor.

19. The method of claim 17, wherein the second switch circuit is coupled between a gate of the second transistor and a drain of the second transistor.

* * * * *

UNITED STATES PATENT AND TRADEMARK OFFICE
CERTIFICATE OF CORRECTION

PATENT NO.        : 7,430,133 B1  
APPLICATION NO.   : 11/142079  
DATED             : September 30, 2008  
INVENTOR(S)       : William J. McIntyre et al.

It is certified that error appears in the above-identified patent and that said Letters Patent is hereby corrected as shown below:

In column 2, line 46, delete "$C_{hold\_n,}$" and insert -- $C_{hold\_in,}$ --, therefor.

Signed and Sealed this

Twentieth Day of January, 2009

JON W. DUDAS  
*Director of the United States Patent and Trademark Office*